(12) United States Patent
Fischer et al.

(10) Patent No.: US 6,457,868 B1
(45) Date of Patent: Oct. 1, 2002

(54) SHAFT BEARING WITH SPHERICAL COLLAR FOR THE SHAFT

(75) Inventors: Helmut Fischer, Remseck; Peter Frehland, Ditzingen, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/950,045

(22) Filed: Sep. 12, 2001

Related U.S. Application Data

(63) Continuation of application No. PCT/EP00/01990, filed on Mar. 8, 2000.

Foreign Application Priority Data

Mar. 12, 1999 (DE) .......................................... 199 11 212

(51) Int. Cl.$^7$ ............................................... F16C 23/04
(52) U.S. Cl. ..................................... 384/192; 384/208
(58) Field of Search ................................ 384/192, 193, 384/194, 195, 196, 197, 198, 199, 200, 201, 202, 203, 204, 205, 206, 208

(56) References Cited

U.S. PATENT DOCUMENTS

| | | | |
|---|---|---|---|
| 408,791 A | * 8/1889 | Cairns | 210/365 |
| 1,627,868 A | * 5/1927 | Roberts | 384/196 |
| 2,948,572 A | * 8/1960 | Beams et al. | 384/196 |
| 3,367,728 A | * 2/1968 | Labbie | 384/208 |
| 3,510,178 A | * 5/1970 | Sowatzke | 384/206 |
| 5,716,143 A | * 2/1998 | Browne et al. | 384/192 |
| 5,718,517 A | * 2/1998 | Morando | 384/192 |

FOREIGN PATENT DOCUMENTS

DE 19524953 1/1997

* cited by examiner

*Primary Examiner*—Thomas R. Hannon
(74) *Attorney, Agent, or Firm*—Crowell & Moring LLP

(57) ABSTRACT

A shaft bearing system having a housing including a spherical collar for the shaft. The shaft bearing is made up of a cage (19) into which the spherical collar (20) is inserted. The cage is installed in a recess (18) in a housing (16); a sleeve (21) is arranged in the interior of the spherical collar, and an axle stub (22) is inserted into the shaft bearing. The rotational movement preferably takes place between the sleeve (21) and the axle stub (22). The use of the spherical collar in a shaft bearing made up of a cage and a guide bushing has the advantage of greater flexibility in selecting the material or materials from which the housing and the rotatable component installed therein may be formed. The shaft bearing of the invention is particularly useful for accommodating a centrifuge rotor (10) in a centrifuge housing (16).

8 Claims, 1 Drawing Sheet

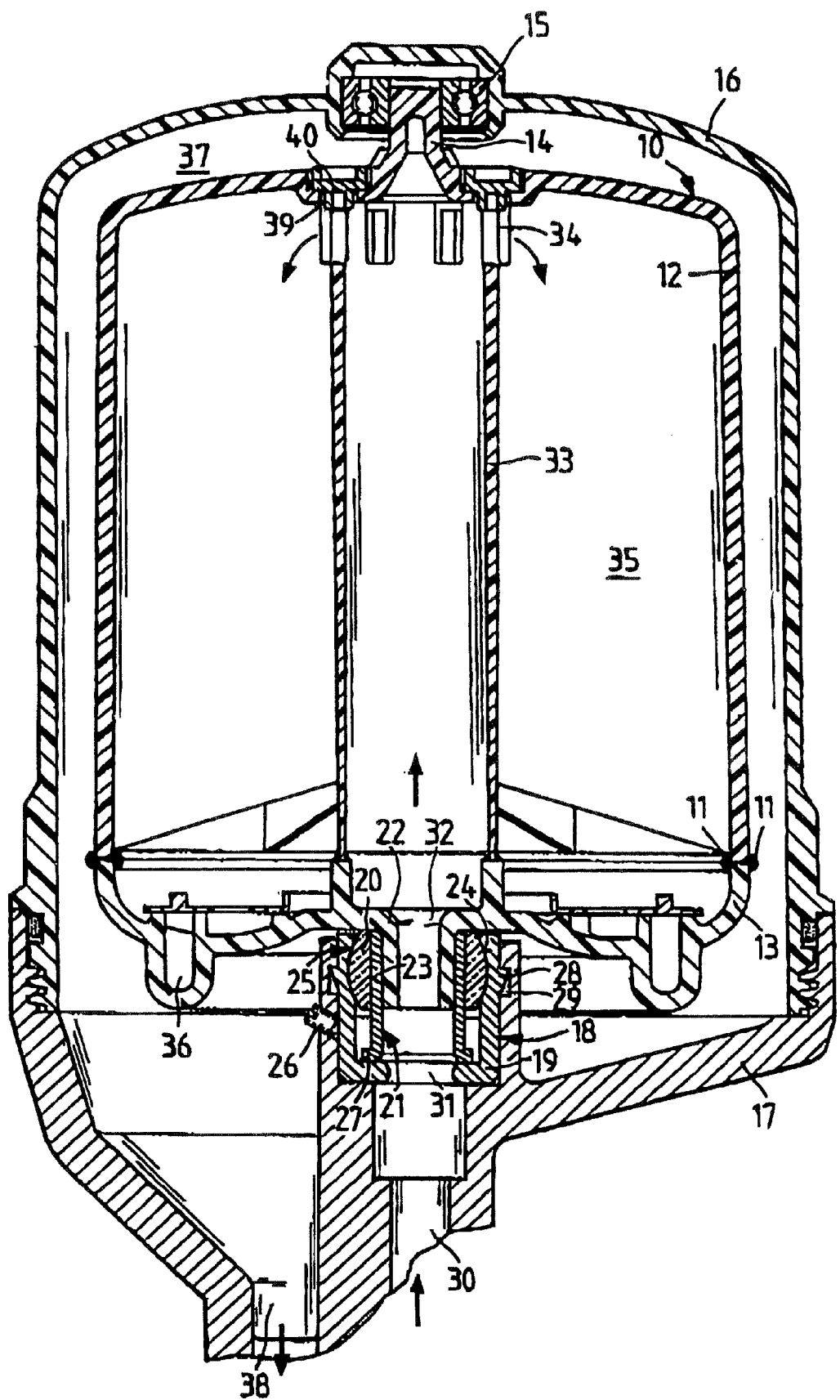

SHAFT BEARING WITH SPHERICAL COLLAR FOR THE SHAFT

CROSS REFERENCE TO RELATED APPLICATIONS

This application is a continuation of International Patent Application No. PCT/EP00/01990, filed Mar. 8, 2000, designating the United States of America, the entire disclosure of which is incorporated herein by reference. Priority is claimed based on Federal Republic of Germany Patent Application No. DE 199 11 212.6, filed Mar. 12, 1999.

BACKGROUND OF THE INVENTION

The invention relates to a shaft bearing comprising a collar with a spherical outer surface for the shaft. For convenience, such a collar will be referred to hereinafter as a spherical collar. Shaft bearings in which spherical collars are used are known. For instance, DE 195 24 953 A1 discloses an electric motor (see FIG. 1), in which the shaft 4 for accommodating the rotor 5 is received in a spherical collar 8 in the housing 7. The spherical collars facilitate compensation of tolerances that, among other things, could also result in an angular displacement of shaft mounted in the bearing. The spherical collar has a cylindrical inner area into which the shaft is inserted, and an outer area that forms a segment of a spherical surface. This may be rotated in an appropriately configured recess in the housing with two rotary degrees of freedom that do not correspond to the degree of freedom of the rotating shaft. This allows any bearing forces that arise to also be minimized even at larger tolerances.

The spherical collars are inserted directly into the housing. In the device according to DE 195 24 953 A1, this is facilitated by elastic latches 32. The shaft 4 is inserted directly in the spherical collar. In such a solution, however, certain guidelines with reference to the materials used for shaft and housing must be observed. If the latches 32 are part of the housing shell, then the housing must be made of an elastic material, particularly plastic. If something more rigid, e.g., metal, is chosen as the material, the recess must be made of several parts in order to receive and rotatably mount the spherical collars 8. For instance, an additional ring with a threaded connection may be provided to form the recess for receiving the spherical collar. However, this would increase the cost of the component, and consequently reduce the economic viability of the bearing.

Furthermore, the direct insertion or mounting of the shaft 4 in the spherical collar 8 necessitates selection of materials with desirable sliding friction properties. This limits the selection of the material pairs. Particularly for shafts made of synthetic resin material (plastic), the life of the structural component is limited by a comparably high frictional wear of the rotating plastic shaft in the spherical collar.

SUMMARY OF THE INVENTION

It is an object of the invention to provide a shaft bearing with spherical collar which can be used regardless of the materials chosen for the shaft which is to be bearingly mounted thereby as well as for the recess in which the shaft bearing is installed.

It is also an object of the invention to provide a centrifuge incorporating the shaft bearing of the invention.

These and other objects have been achieved in accordance with the present invention by providing a shaft bearing comprising a spherical collar, in which an outside of the spherical collar is accommodated with two rotational degrees of freedom in a recess; the recess is a part of a cage which forms a pre-assembled unit together with the spherical collar and which can be mounted at a mounting location of the shaft bearing; a rotational body is accommodated in a rotatable manner inside the spherical collar, the rotational body comprising a sleeve into which a component to be rotatably mounted by the shaft bearing can be inserted, and the sleeve is provided with a retaining device which limits the axial play of the sleeve, thereby preventing the sleeve from slipping out of the spherical collar.

In accordance with a further aspect of the invention, the objects are achieved by providing a centrifuge comprising a shaft bearing according to the invention, in which the component to be rotatably mounted by the bearing is a centrifuge rotor, one end of which is received in the shaft bearing.

The shaft bearing according to the invention forms a bearing unit composed of the spherical collar itself and a cage. The spherical collar is arranged in a recess provided in the cage for this purpose. The recess forms the spherical interior surface, which communicates with the corresponding spherical exterior surface of the spherical collar. The cage may be made of a resilient or elastic material, such as plastic. The spherical collar can then be easily pressed into this component without the need for additional fasteners. The shaft bearing can then be simply mounted and fastened at the mounting location, e.g., in a housing. A rotational body, e.g., the shaft to be rotatably mounted in the bearing, then rotates in the interior of the spherical collar.

In accordance with the invention, the rotational body is a sleeve, which is connected to the interior surface of the spherical collar. The component to be rotatably mounted by the bearing is inserted into this sleeve. As a result, a direct connection between the component to be rotatably mounted and the spherical collar is avoided. This facilitates greater flexibility in the selection of the material from which the component to be rotatably mounted, can be made. The relative movement in rotating the component mounted in the bearing takes place between the sleeve and the spherical collar. The component to be rotatably mounted by the bearing is press fitted, adhesively bonded or fastened in some other way in the sleeve. It is thereby determined in accordance with the relative movement of sleeve and spherical collar, which connection exhibits the more favorable gliding properties. In choosing a plastic part to be accommodated, it makes sense, for example, to press this into the sleeve so that the sleeve rotates in the spherical collar. A metal to metal material pairing that exhibits low frictional wear can then be selected for the spherical collar and sleeve, respectively.

In accordance with one advantageous embodiment, two sintered materials are used as a material pairing for the spherical collar and the sleeve. The manufacture of these components of sintered materials results in cost savings because production time is reduced. Moreover, the cost of materials is decreased since sintered parts do not need to be post-treated under tension. Very good surface properties for the spherical collar and sleeve can be attained by producing the parts in a sintering process. This allows for an improvement in the frictional resistance while producing the sliding partner economically. An example of materials for a slide bearing combination with two sintered materials is the use of sintered steel D11 and sintered bronze B50, respectively, for the two sliding parts.

In accordance with another advantageous embodiment of the invention, an arresting element may be provided between the cage and the mounting location to secure the shaft bearing. This arresting element enables the shaft bearing to be secured in the mounting location without placing the shaft bearing under stress. This can be achieved through use of an interlocking connection. It is also possible to provide latching elements on the cage. These latching elements, particularly when made of plastic, may be elastically deformed when pushed into the mounting location, and then rebound into mating receptacles in the mounting recess, so that the cage is mounted in position without being under stress. A further possibility is to provide stud screw, which is arranged in a thread at the mounting location, and which when screwed in, secures the cage in the mounting location without placing it under stress. An appropriate projecting part can be provided in the cage for engaging the screw. In comparison with pressing fitting the shaft bearing in its mounting location, the provision of an interlocking arresting element which does not stress the bearing has the advantage that the bearing parts will not be deformed in such a way that the spherical collar will move stiffly in the cage. In this way, the function of the spherical collar, which is to compensate for an offset angle of the rotational body, is unlimited.

If the sleeve is accommodated in the spherical collar in a rotatable manner, then in accordance with one advantageous embodiment of the invention, it can be provided with a retaining device. This may comprise a shoulder, for example, which prevents the sleeve from slipping out of the spherical collar. This reduces the probability of error when mounting or replacing the component to be rotatably mounted in the bearing. By selecting an appropriate sleeve length and providing clearance in the receiving cage, the sleeve can be provided with axial play despite the presence of the retaining device. This gives the shaft bearing a further, axial degree of freedom, which allows the shaft bearing to be used as a movable bearing.

The shaft bearing according to the invention is suitable for installation in a centrifuge, in which the component to be rotatably mounted by the bearing is a centrifuge rotor. Such a rotor can be equipped at least on one end with a shaft bearing according to the invention. This brings with it the aforementioned advantages, especially in conjunction with a centrifugal rotor produced of synthetic resin material.

Since centrifugal rotors are operated with high rotational speed, it is particularly advantageous that the bearing can be secured in its mounting position without placing it under stress which might distort one or more of the bearing parts and impede its free rotation. The occurrence of angle tolerances with respect to the rotational axis of the rotor does not limit its functionality. This measure also reduces the component stress acting on the rotor. Not least, this may minimize the occurrence of balance errors in the centrifugal rotor during its service life.

In one advantageous embodiment of the centrifuge, the rotor support axle to be received in the shaft bearing is constructed as a hollow shaft. At the same time, a supply opening is provided in the cage of the shaft bearing. This results in an inlet channel for a fluid to be centrifuged. This fluid enters the cage through the supply opening and is conducted through the hollow shaft into the interior space of the centrifugal rotor. If the centrifuge is operated as an oil centrifuge, this structural configuration simultaneously achieves a reliable lubrication of the spherical collar, thereby minimizing its frictional wear. Insofar as play is provided between the spherical collar and the cage, a seal is generated here because of the applied oil pressure, since the oil pressure presses the spherical collar in its recess, in a manner similar to a ball valve.

In the described case of a centrifuge, it is therefore necessary that the individual components of the shaft bearing, comprising the cage, the spherical collar, and the sleeve, can be sealed relative to one another. This is achieved through appropriate surface pairings. Moreover, the cage must be sealed relative to the mounting location, and the sleeve must be sealed relative to the rotational body. Here, a slight leakage flow may be acceptable, however, depending on the application. It is possible to use a sealed shaft bearing of the aforedescribed type wherever the shaft bearing is installed in a boundary region between a fluid-conducting space and a space sealed from this fluid. This is particularly the case when a fluid is to be simultaneously passed through the shaft bearing, e.g., through the component which is to rotatably mounted by the bearing.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to an illustrative preferred embodiment of a centrifuge shown in the accompanying drawing FIGURE incorporating a shaft bearing according to the invention.

DETAILED DESCRIPTION OF PREFERRED EMBODIEMTS

The centrifuge according to the invention comprises a centrifuge rotor 10 composed of two shells 12, 13 joined through a spin welded joint 11. The shell 12 has a shaft shoulder 14 which is received in a ball bearing 15, and the ball bearing 15, in turn, is fastened in a recess in a plastic housing bell 16. The housing bell is mounted on a housing support 17 made of aluminum, which has a receptacle 18 for accommodating a cage 19. The cage, together with a spherical collar 20 and a sleeve 21, forms a shaft bearing, into which a hollow axle journal 22 can be inserted. The axle journal is part of the shell 13, and in such a manner, forms the second bearing of the centrifugal rotor 10.

The axle journal 22 is pressed into the sleeve 21. The sleeve 21, in turn, is slidably mounted inside the interior surface 23 of the spherical collar 20. The centrifuge rotor 10 can therefore move without any great resistance to turning. A spherical exterior surface 24 of the spherical collar is received in a recess 25 of the cage 19. This recess has the inner surface of a spherical segment, so that the spherical collar can move freely therein. The cage 19 is retained in the receptacle 18 by a stud screw 26. A retaining member 27 in the form of a shoulder is provided on the sleeve 21. The shoulder 27 prevents the sleeve 21 from slipping past the screw 26 and out of the spherical collar 20. Latches 28 on the cage 19 may also be provided as an alternative to, or in addition to, the stud screw, with the latches engaging in an annular groove 29 in the recess 18 in which the bearing is mounted to hold the bearing in place.

An inlet 30 for the fluid to be centrifuged is provided in the housing support 17. This corresponds to a feed opening 31 in the cage 19, so that the fluid to be centrifuged can pass into the interior of the cage. From there, the fluid passes through the hollow axle journal, which forms an supply port 32, and enters a center passageway 33 of the centrifuge. The fluid then passes through openings 34 and reaches the separation chamber 35. From chamber 35, the fluid exits through nozzles 36 to drive the rotor of the centrifuge, and enters a housing space 37, from where it can drain away through an outlet 38 in the housing support 17.

The openings 34 are formed by projections in the casting mold, not shown, for the shell 12. An annular gap 39, needed to remove the mold noses from the molded hollow shaft, is then closed off by an annular closure member 40, which can be welded with the shell 12, for instance.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A shaft bearing comprising a spherical collar, wherein
   an outside of the spherical collar is accommodated with two rotational degrees of freedom in a recess,
   the recess is a part of a cage, which forms a pre-assembled unit together with the spherical collar and which can be mounted at a mounting location of the shaft bearing,
   a rotational body is accommodated in a rotatable manner inside the spherical collar, said rotational body comprising a sleeve into which a component to be rotatably mounted by the shaft bearing can be inserted,
   the sleeve is provided with a retaining device, which limits the axial play of the sleeve, thereby preventing the sleeve from slipping out of the spherical collar, and
   the shaft bearing further comprising an arresting element for holding said cage in the bearing mounting location, wherein the arresting element comprises snap latches with clips for preventing relative movement between the cage and the mounting location.

2. A shaft bearing according to claim 1, wherein the arresting element comprises a stud screw for limiting relative movement between the cage and the mounting location.

3. A shaft bearing according to claim 1, wherein the sleeve and the spherical collar are each formed of a respective sintered material.

4. A shaft bearing according to claim 1, wherein the spherical collar is provided with a permanently attached insert, with which the sleeve is connected.

5. A shaft bearing according to claim 1, wherein the mounting location, cage, spherical collar, sleeve, and the component to be rotatably mounted by the bearing are assembled such that a seal is produced between them.

6. A centrifuge comprising a shaft bearing according to claim 1, wherein the component to be rotatably mounted by the bearing is a centrifuge rotor, one end of which is received in the shaft bearing.

7. A centrifuge according to claim 6, wherein the centrifuge rotor has a hollow axle journal, which is connected with the shaft bearing and which constitutes an inlet for a fluid to be centrifuged, and wherein the cage of the shaft bearing is provided with a feed opening for the fluid to be centrifuged.

8. A shaft bearing comprising a spherical collar, wherein
   an outside of the spherical collar is accommodated with two rotational degrees of freedom in a recess,
   the recess is a part of a cage, which forms a pre-assembled unit together with the spherical collar and which can be mounted at a mounting location of the shaft bearing,
   a rotational body is accommodated in a rotatable manner inside the spherical collar, said rotational body comprising a sleeve into which a component to be rotatably mounted by the shaft bearing can be inserted,
   the sleeve is provided with a retaining device, which limits the axial play of the sleeve, thereby preventing the sleeve from slipping out of the spherical collar,
   the component to be rotatably mounted by the bearing is a centrifuge rotor, one end of which is received in the shaft bearing, and
   the centrifuge rotor has a hollow axle journal, which is connected with the shaft bearing and which constitutes an inlet for a fluid to be centrifuged, and wherein the cage of the shaft bearing is provided with a feed opening for the fluid to be centrifuged.

* * * * *